(12) United States Patent
Tsai et al.

(10) Patent No.: US 10,761,414 B2
(45) Date of Patent: Sep. 1, 2020

(54) PROJECTION APPARATUS AND LIGHT SOURCE APPARATUS HAVING WAVELENGTH CONVERSION DEVICE AND FILTER DEVICE

(71) Applicant: Coretronic Corporation, Hsin-Chu (TW)

(72) Inventors: Chih-Hsien Tsai, Hsin-Chu (TW); Yi-Hsuang Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/232,077

(22) Filed: Dec. 26, 2018

(65) Prior Publication Data

US 2019/0204724 A1   Jul. 4, 2019

(30) Foreign Application Priority Data

Dec. 29, 2017   (CN) .......................... 2017 1 1469088

(51) Int. Cl.
*G03B 21/20*         (2006.01)
(52) U.S. Cl.
CPC ....... *G03B 21/204* (2013.01); *G03B 21/2013* (2013.01)
(58) Field of Classification Search
CPC .......................... G03B 21/2013; G03B 21/204
See application file for complete search history.

(56) References Cited

U.S. PATENT DOCUMENTS

| | | | | |
|---|---|---|---|---|
| 9,229,301 B2 * | 1/2016 | Huang | ................. | G03B 21/142 |
| 9,442,357 B2 * | 9/2016 | Ferri | .................... | G03B 21/204 |
| 9,470,886 B2 * | 10/2016 | Bartlett | ................ | G02B 26/008 |
| 9,778,553 B2 * | 10/2017 | Hu | ........................ | G03B 21/204 |
| 9,880,453 B2 * | 1/2018 | Huang | ................. | G03B 21/204 |
| 9,897,907 B2 * | 2/2018 | Hsieh | ................. | G03B 21/2013 |
| 10,133,164 B2 * | 11/2018 | Okuda | ................. | G03B 21/204 |

(Continued)

FOREIGN PATENT DOCUMENTS

| | | |
|---|---|---|
| CN | 102914939 | 2/2013 |
| CN | 103186020 | 7/2013 |

(Continued)

OTHER PUBLICATIONS

"Office Action of Taiwan Counterpart Application," dated Apr. 8, 2019, p. 1-p. 5.

*Primary Examiner* — Bao-Luan Q Le
(74) *Attorney, Agent, or Firm* — JCIPRNET

(57) ABSTRACT

A projection apparatus and a light source apparatus are provided. The light source apparatus includes at least one first light source, at least one second light source, a wavelength conversion device, and a filter device. The wavelength conversion device is disposed on a transmission path of the first light beam from the first light source, and converts the first light beam into a conversion light beam. The filter device corresponds to the wavelength conversion device and is disposed between the first light source and the wavelength conversion device and disposed between the second light source and the wavelength conversion device. The filter device allows the first light beam and the conversion light beam to pass through, and reflects the second light beam. The projection apparatus and the light source apparatus have favorable light source utilization efficiency.

14 Claims, 7 Drawing Sheets

(56) References Cited

U.S. PATENT DOCUMENTS

| | | | |
|---|---|---|---|
| 10,197,896 B2* | 2/2019 | Yan | G03B 21/142 |
| 10,203,591 B2* | 2/2019 | Hu | H04N 9/315 |
| 2013/0100420 A1* | 4/2013 | Ferri | G03B 21/204 |
| | | | 353/31 |
| 2014/0204558 A1* | 7/2014 | Bartlett | G02B 26/008 |
| | | | 362/84 |
| 2015/0002823 A1* | 1/2015 | Yan | G03B 21/142 |
| | | | 353/31 |
| 2015/0029467 A1* | 1/2015 | Sugiyama | H04N 9/3161 |
| | | | 353/31 |
| 2015/0177599 A1* | 6/2015 | Huang | G03B 21/142 |
| | | | 353/31 |
| 2015/0316775 A1* | 11/2015 | Hsieh | G03B 21/2013 |
| | | | 353/31 |
| 2016/0004147 A1* | 1/2016 | Hu | H04N 9/315 |
| | | | 362/84 |
| 2016/0026076 A1* | 1/2016 | Hu | G03B 21/204 |
| | | | 353/84 |
| 2016/0041457 A1* | 2/2016 | Oh | G03B 21/204 |
| | | | 353/31 |
| 2016/0360166 A1* | 12/2016 | Ogawa | G02B 26/008 |
| 2017/0045810 A1* | 2/2017 | Huang | G03B 21/204 |
| 2017/0347075 A1* | 11/2017 | Okuda | G03B 21/204 |
| 2019/0018308 A1* | 1/2019 | Takizawa | F21V 9/40 |
| 2019/0199981 A1* | 6/2019 | Murakami | G03B 21/00 |

FOREIGN PATENT DOCUMENTS

| | | |
|---|---|---|
| CN | 102830582 | 8/2014 |
| CN | 104009029 | 8/2014 |
| CN | 102707551 | 4/2015 |
| TW | 201140224 | 11/2011 |

* cited by examiner

PROJECTION APPARATUS AND LIGHT SOURCE APPARATUS HAVING WAVELENGTH CONVERSION DEVICE AND FILTER DEVICE

CROSS-REFERENCE TO RELATED APPLICATION

This application claims the priority benefit of China application serial no. 201711469088.1, filed on Dec. 29, 2017. The entirety of the above-mentioned patent application is hereby incorporated by reference herein and made a part of this specification.

BACKGROUND

Technical Field

The disclosure relates to an optical apparatus and more particularly relates to a projection apparatus and a light source apparatus.

Description of Related Art

A projector is a type of display apparatus for generating large-sized images. The imaging principle is to convert an illumination light beam provided by a light source module into an image light beam using a light valve and then to project the image light beam onto a screen using a projection lens to form an image. Such a projector plays an important role in information delivery, and thus has been widely used in many fields. With a projector and a projection screen, a user may present an image in line with the image information provided from an image source.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection apparatus and a light source apparatus that have favorable light source utilization efficiency.

Other objects and advantages of the disclosure may be understood from the technical features of the disclosure.

In order to achieve one or a portion of or all of the objects or other objects, according to an embodiment of the disclosure, a projection apparatus is provided, including a light source apparatus, a light valve, and a projection lens. The light source apparatus is configured to provide an illumination light beam. The light source apparatus includes at least one first light source, at least one second light source, a wavelength conversion device, and a filter device. The first light source is configured to provide a first light beam. The second light source is configured to provide a second light beam, wherein a wavelength of the first light beam is different from a wavelength of the second light beam. The wavelength conversion device is disposed on a transmission path of the first light beam from the at least one first light source and is configured to convert the first light beam into a conversion light beam. The filter device corresponds to the wavelength conversion device. The filter device is disposed between the at least one first light source and the wavelength conversion device. The filter device is disposed between the at least one second light source and the wavelength conversion device. The filter device is configured to allow the first light beam and the conversion light beam to pass through and configured to reflect the second light beam. The illumination light beam includes the conversion light beam and the second light beam. The light valve is disposed on a transmission path of the illumination light beam and configured to convert the illumination light beam into an image light beam. The projection lens is disposed on a transmission path of the image light beam, wherein the image light beam becomes a projection light beam after passing through the projection lens.

In order to achieve one or a portion of or all of the objects or other objects, according to another embodiment of the disclosure, a light source apparatus is provided, including at least one first light source, at least one second light source, a wavelength conversion device, and a filter device. The first light source is configured to provide a first light beam. The second light source is configured to provide a second light beam, wherein a wavelength of the first light beam is different from a wavelength of the second light beam. The wavelength conversion device is disposed on a transmission path of the first light beam from the at least one first light source and configured to convert the first light beam into a conversion light beam. The filter device corresponds to the wavelength conversion device. The filter device is disposed between the at least one first light source and the wavelength conversion device. The filter device is disposed between the at least one second light source and the wavelength conversion device. The filter device is configured to allow the first light beam and the conversion light beam to pass through and reflect the second light beam.

Based on the above, the embodiments of the disclosure achieve at least one of the followings. According to the embodiments of the disclosure, the wavelength conversion device in the light source apparatus may be provided with the filter device thereon, such that the first light beam penetrating/passing through the filter device may be transmitted to the wavelength conversion device and be converted into the conversion light beam. The second light beam may be reflected back to the optical system. Therefore, the utilization efficiency of the second light beam and the conversion light beam is improved, so that the projection apparatus and the light source apparatus have favorable light source utilization efficiency.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
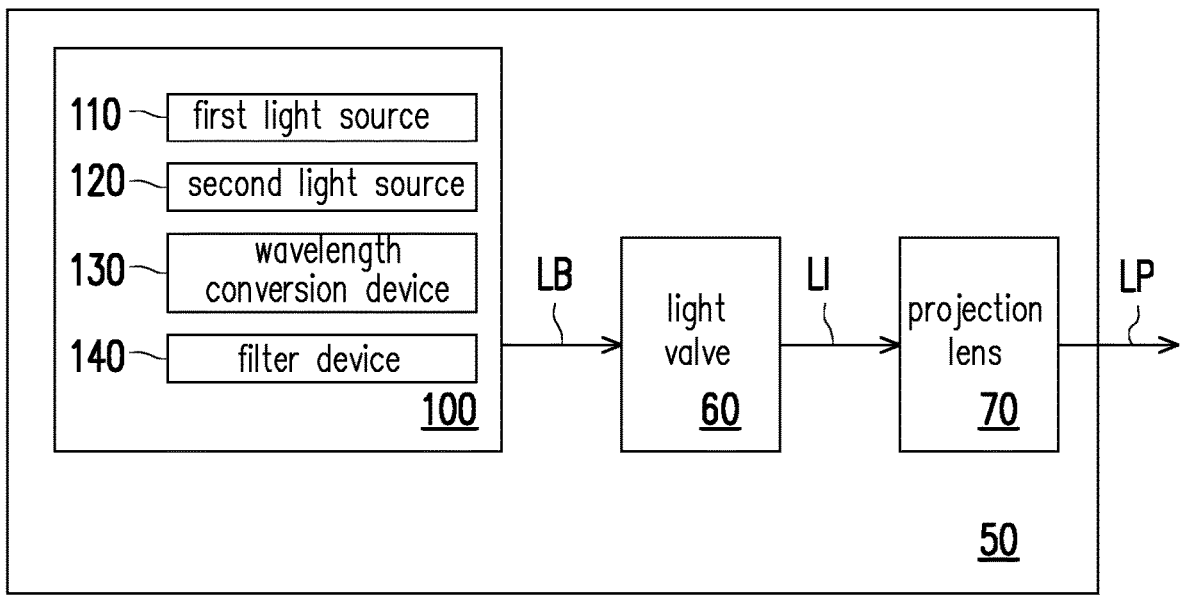
FIG. 1A is a block diagram of the projection apparatus according to an embodiment of the disclosure.
Figure 1B:
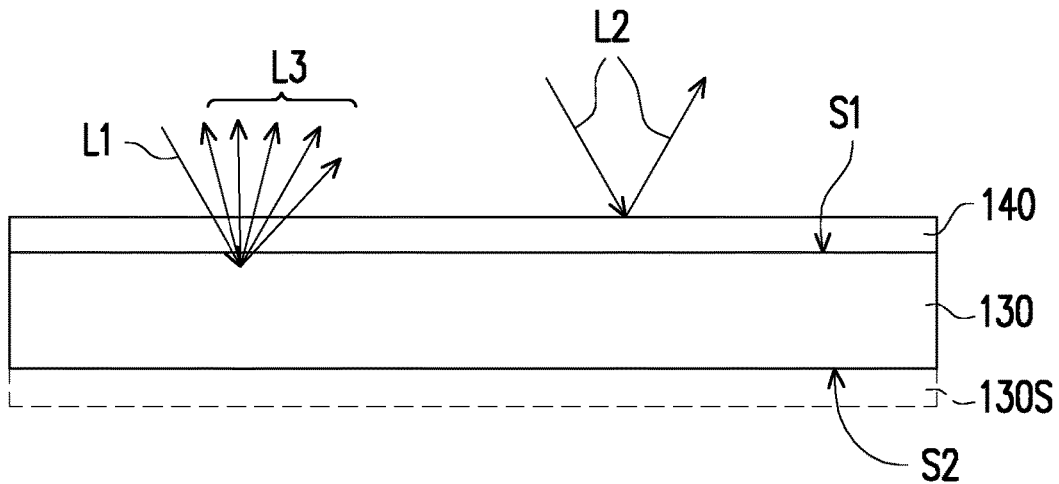
FIG. 1B is a schematic side view of the wavelength conversion device.
Figure 2:
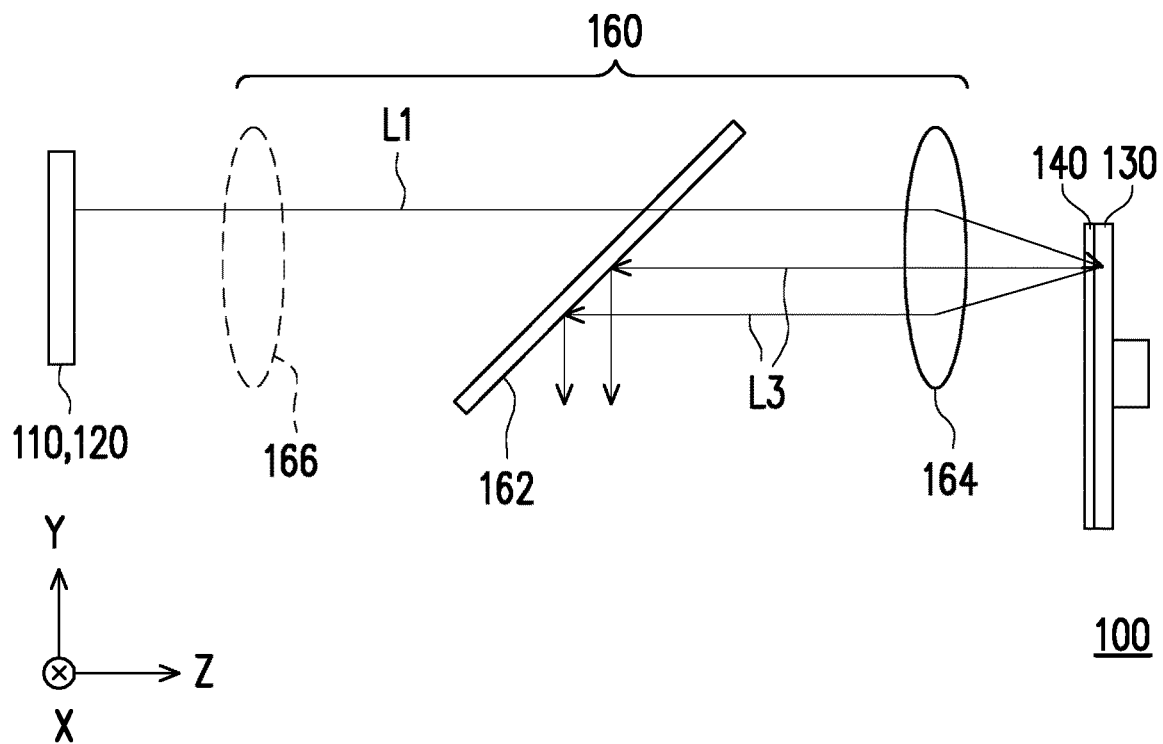
FIG. 2 is a schematic view of the first light beam and the conversion light beam in the light source apparatus according to an embodiment of the disclosure.
Figure 3:
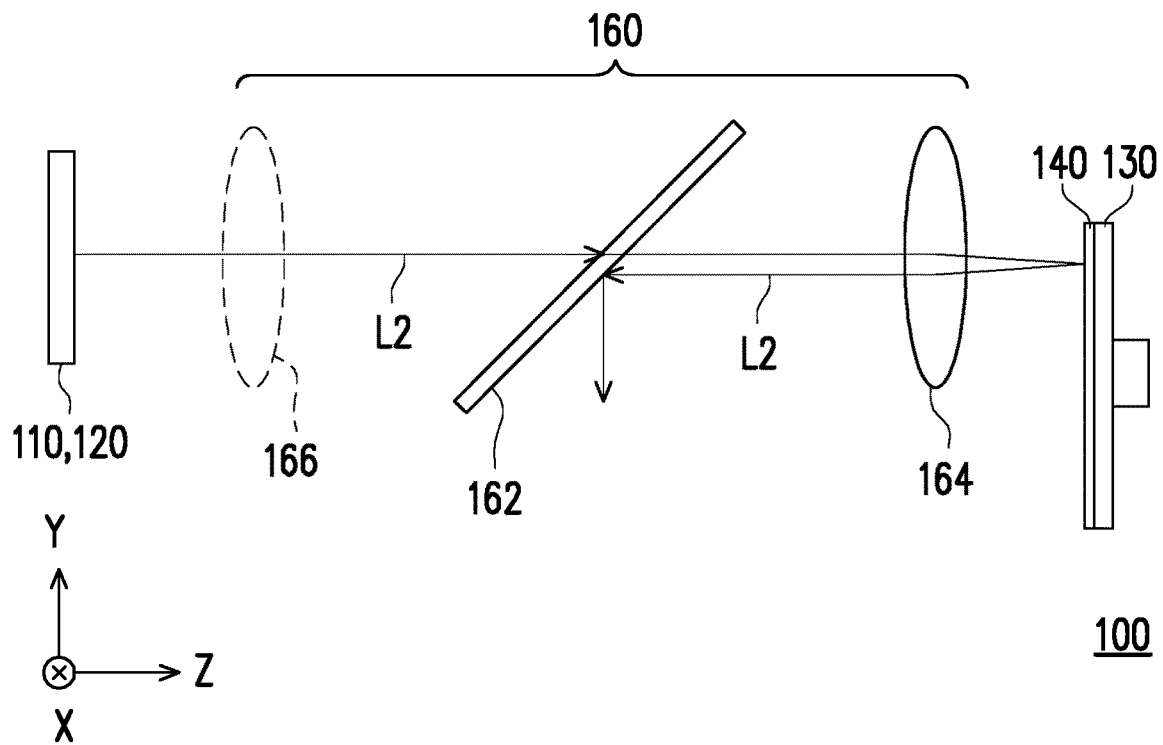
FIG. 3 is a schematic view of the second light beam in the light source apparatus according to an embodiment of the disclosure.

FIG. 1A is a block diagram of a projection apparatus according to an embodiment of the disclosure. FIG. 1B is a schematic side view of a wavelength conversion device. FIG. 2 is a schematic view of a first light beam and a conversion light beam in a light source apparatus according to an embodiment of the disclosure. FIG. 3 is a schematic view of a second light beam in the light source apparatus according to an embodiment of the disclosure. Referring to FIG. 1A, FIG. 1B, FIG. 2, and FIG. 3, in this embodiment, the projection apparatus 50 includes a light source apparatus 100, a light valve 60, and a projection lens 70. The light source apparatus 100 providers an illumination light beam LB. The light valve 60 is disposed on a transmission path of the illumination light beam LB and converts the illumination light beam LB into an image light beam LI. The projection lens 70 is disposed on a transmission path of the image light beam LI, and the image light beam LI passes through the projection lens 70 and becomes a projection light beam LP, so as to form a projection image.

The light valve 60 includes a digital micro-mirror device (DMD), a liquid-crystal display (LCD), or a liquid crystal on silicon panel (LCoS panel), for example. In addition, the light valve 60 may also include a transmissive light modulator, such as a transparent liquid crystal panel, an electro-optical modulator, a magneto-optic modulator, and an acousto-optic modulator (AOM), for example. Nevertheless, the disclosure is not intended to limit the light valve to certain forms or types.

In this embodiment, the light source apparatus 100 includes at least one first light source 110, at least one second light source 120, a wavelength conversion device 130, and a filter device 140. The first light source 110 is configured to provide a first light beam L1. The second light source 120 is configured to provide a second light beam L2. In this embodiment, the first light source 110 and the second light source 120 are solid-state light sources, such as a laser diode or a light emitting diode (LED). Nevertheless, the disclosure is not limited thereto. In this embodiment, a wavelength of the first light beam L1 is different from a wavelength of the second light beam L2. For example, the first light beam L1 is a blue light beam having a wavelength of 445 nm or 455 nm and the second light beam L2 is a blue light beam having a wavelength of 460 nm, for example, but the disclosure is not limited thereto. In other embodiments, the second light beam L2 may be a red light beam having a wavelength of 638 nm, for example, but the disclosure is not limited thereto. The wavelength conversion device 130 is disposed on a transmission path of the first light beam L1 from the at least one first light source 110 and is configured to convert the first light beam L1 into a conversion light beam L3. In this embodiment, the wavelength conversion device 130 is disposed on a substrate 130S, for example. In this embodiment, the wavelength conversion device 130 is located between the filter device 140 and the substrate 130S. The filter device 140 is located on a surface S1 of the wavelength conversion device 130, for example, and the substrate 130S is located on a surface S2 of the wavelength conversion device 130, for example. Nevertheless, the disclosure is not limited thereto. In an embodiment, the substrate 130S is, for example, a reflective substrate, so that a reflective wavelength conversion assembly composed of the wavelength conversion device 130 and the substrate 130S is capable of reflecting the conversion light beam L3 back to the filter device 140. In an embodiment, the substrate 130S is, for example, a transmissive substrate, so that a transmissive wavelength conversion assembly composed of the wavelength conversion device 130 and the substrate 130S allows the conversion light beam L3 to pass through. The filter device 140 is disposed corresponding to the wavelength conversion device 130. In addition, the filter device 140 is disposed between the first light source 110 and the wavelength conversion device 130 and is disposed between the second light source 120 and the wavelength conversion device 130. The filter device 140 is configured to allow the first light beam L1 and the conversion light beam L3 to pass through and is configured to reflect the second light beam L2. In an embodiment, the wavelength conversion device 130 has a wavelength conversion region composed of at least one wavelength conversion material, and the filter device 140 corresponds to the wavelength conversion material (the wavelength conversion region). In an embodiment, the wavelength conversion material in the wavelength conversion region is used to convert the first light beam L1 from the filter device 140 into the conversion light beam L3. In an embodiment, the wavelength conversion device 130 has a non-wavelength conversion region that does not convert the wavelength of the first light beam L1, and the filter device 140 corresponds to the non-wavelength conversion region. In some embodiments, the non-wavelength conversion region may be a reflective region. Therefore, the non-wavelength conversion region may reflect the first light beam L1 from the filter device 140 back to the filter device 140. In some embodiments, the non-wavelength conversion region may be a transmissive region. Therefore, the non-wavelength conversion region may allow the first light beam L1 from the filter device 140 to pass through. That is, the first light beam L1 may pass through the filter device 140 and the non-wavelength conversion region sequentially.

In addition, the disclosure is not limited to the relationship, in which the filter device 140 and the wavelength conversion material (the wavelength conversion region) of the wavelength conversion device correspond to each other. That is to say, in this embodiment, the filter device 140 may correspond to one single wavelength conversion material (the wavelength conversion region) or may correspond to multiple wavelength conversion materials (wavelength conversion regions). In other words, in this embodiment, the filter device 140 corresponds to all or a part of at least one wavelength conversion material (at least one wavelength conversion region).

It is known from the above that, since the second light beam L2 does not enter the wavelength conversion device 130, the second light beam L2 is not excited by the wavelength conversion material (the wavelength conversion region) in the wavelength conversion device 130. Therefore, the second light beam L2 is reflected back to the system to be fully utilized, so as to improve the light source utilization efficiency.

Specifically, in this embodiment, the wavelength conversion device 130 is, for example, a wavelength conversion wheel, such as a phosphor wheel or a fluorescence wheel, for converting the first light beam L1 into the conversion light beam L3 having a different wavelength. In particular, in this embodiment, the wavelength conversion device 130 includes at least one wavelength conversion material (e.g., phosphor or fluorescence), and the wavelength conversion material is used to convert the first light beam L1 into the conversion light beam L3 having a different wavelength.

To be more specific, in this embodiment, the filter device 140 is, for example, a coating on the wavelength conversion device 130. In other embodiments, the filter device 140 may also be a filter that is connected or fixed to the wavelength conversion device 130, for example, or the filter device 140 may be selectively disposed to be separated from the wavelength conversion device 130. Nevertheless, the disclosure is not limited thereto. In this embodiment, the position of the filter device 140 corresponds to the wavelength conversion material (e.g., phosphor or fluorescence) on the wavelength conversion device 130, but the disclosure is not limited thereto.

In this embodiment, the illumination light beam LB (in reference to FIG. 1) provided by the light source apparatus 100 includes the conversion light beam L3 converted from the first light beam L1 and the second light beam L2 reflected from the filter device 140. That is, the illumination light beam LB includes the conversion light beam L3 from the wavelength conversion material (the wavelength conversion region) of the wavelength conversion device 130 and the second light beam L2 from the filter device 140. Since the second light beam L2 does not enter the wavelength conversion device 130, the utilization efficiency of the second light beam L2 is improved. As a result, the light source apparatus 100 has favorable light source utilization efficiency. In an embodiment not shown here, the illumination light beam LB includes a first light beam L1 that is not excited. That is, the illumination light beam LB includes the first light beam L1 from the non-wavelength conversion region of the wavelength conversion device 130. Nevertheless, the disclosure is not limited thereto.

Figure 4A:
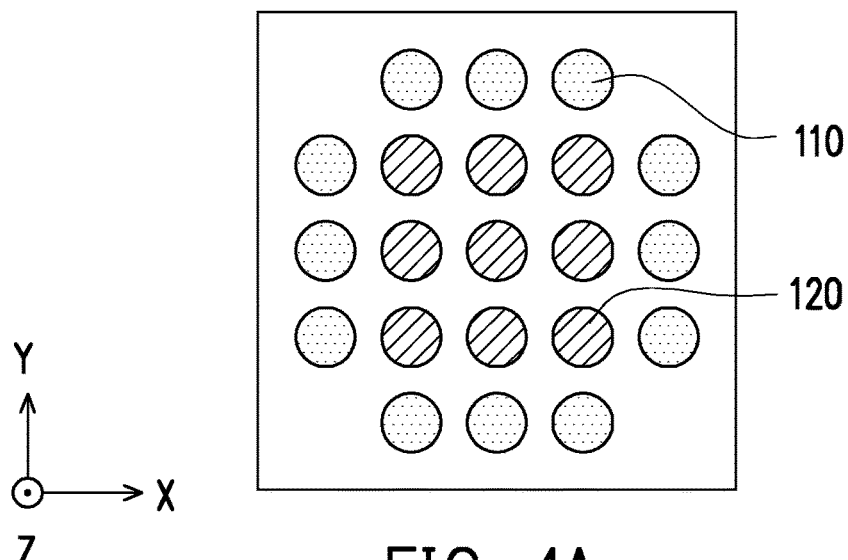
FIG. 4A to FIG. 4C are schematic views of the first light sources and the second light sources according to three embodiments of the disclosure.
Figure 4B:
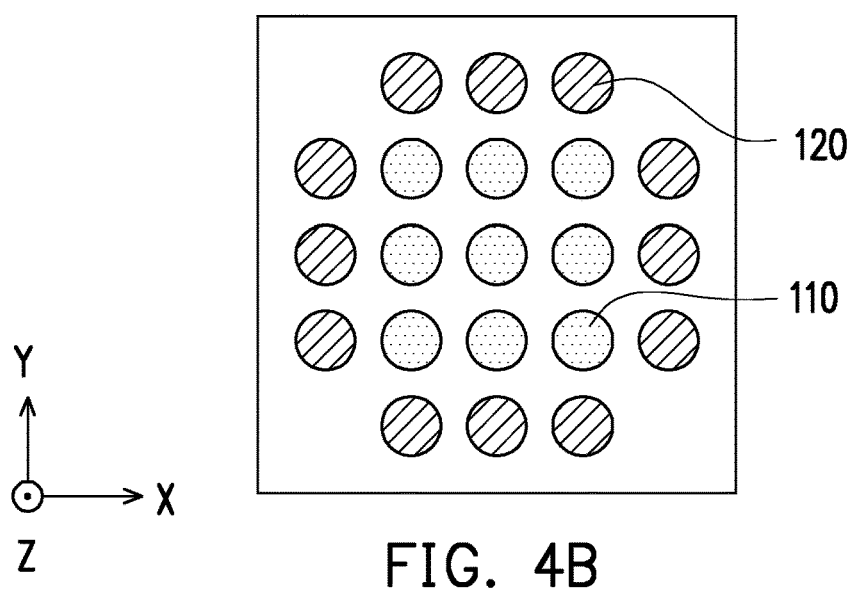

In this embodiment, an optical guide device 160 including a dichroic device 162 and a lens element 164 may be further provided in the light source apparatus 100. The dichroic device 162 may determine whether a light beam is allowed to pass through or is reflected, and the lens element 164 focuses the light beam, but the disclosure is not limited thereto. In other embodiments, the optical guide device 160 may further include a lens 166, but the disclosure is not limited thereto. In an embodiment, the optical guide device 160 may further include a movable member to move or rotate the dichroic device 162, but the disclosure is not limited thereto. In addition, in the embodiments of FIG. 2 and FIG. 3, multiple light sources are arranged, for example, in a form that a plurality of the first light sources 110 surround a plurality of the second light sources 120, as shown in FIG. 4A. Nevertheless, the disclosure is not limited thereto. In other embodiments, multiple light sources may also be arranged in a form that a plurality of the second light sources 120 surround a plurality of the first light sources 110, as shown in FIG. 4B. Nevertheless, the disclosure is not limited thereto.

Figure 4C:
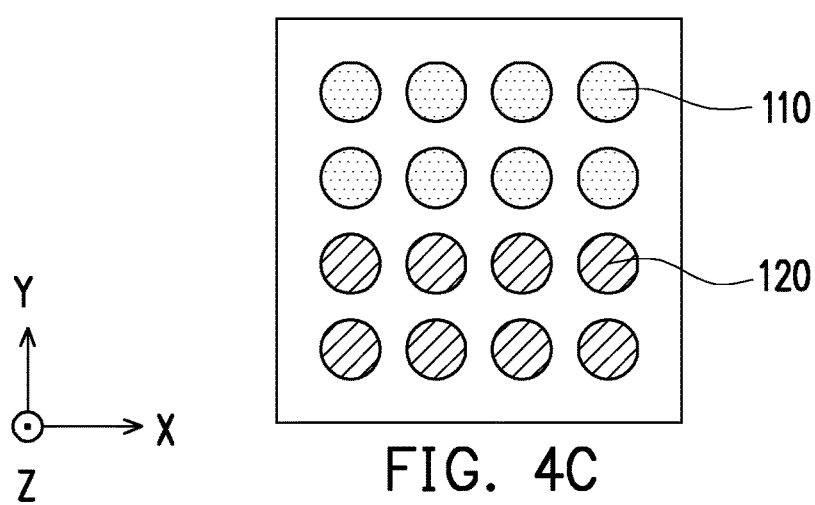

FIG. 4C is a schematic view of the first light sources and the second light sources according to an embodiment of the disclosure. Referring to FIG. 4C, a plurality of the first light sources 110 and a plurality of the second light sources 120 are arranged side by side, for example. That is, the first light sources 110 in the upper row and the second light sources 120 in the lower row are arranged side by side to each other. Nevertheless, the disclosure is not limited thereto.

In an embodiment not shown here, the number of the first light sources 110 in the upper row may be one and the number of the second light sources 120 in the lower row may be one as well, but the disclosure is not limited thereto. In the embodiment described above, an optical axis of the first light beam L1 provided by the first light source 110 is, for example, parallel to an optical axis of the second light beam L2 provided by the second light source 120. Nevertheless, the disclosure is not limited thereto. An embodiment is provided below to illustrate a case where the optical axis of the first light beam L1 is not parallel to the optical axis of the second light beam L2.

Figure 5:
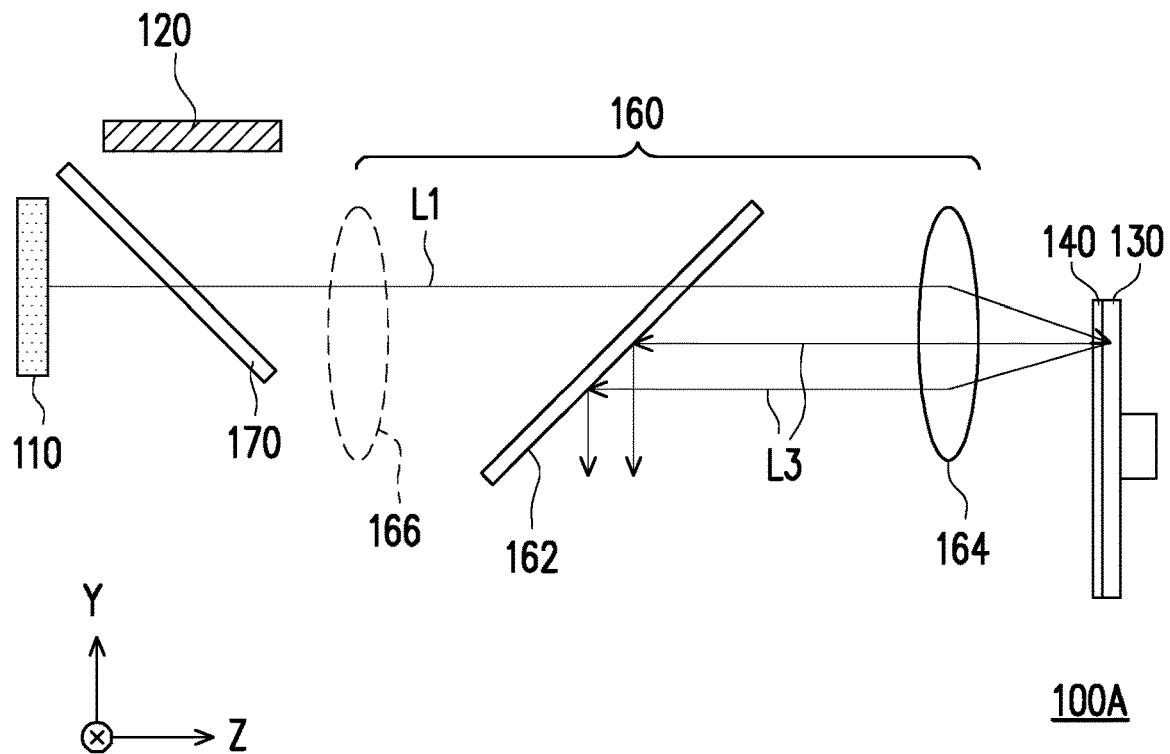
FIG. 5 is a schematic view of the first light beam and the conversion light beam in the light source apparatus according to another embodiment of the disclosure.
Figure 6:
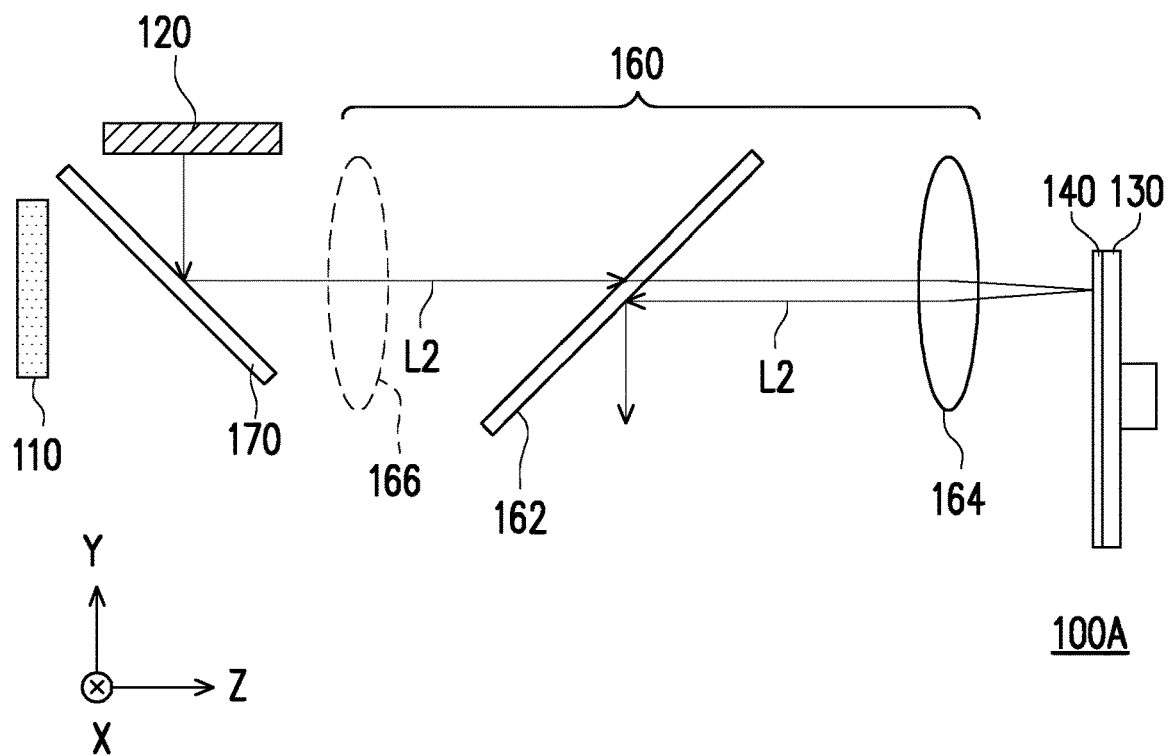
FIG. 6 is a schematic view of the second light beam in the light source apparatus according to another embodiment of the disclosure.

FIG. 5 is a schematic view of a first light beam and a conversion light beam in a light source apparatus according to another embodiment of the disclosure. FIG. 6 is a schematic view of a second light beam in the light source apparatus according to another embodiment of the disclosure. Referring to FIG. 5 and FIG. 6, the light source apparatus 100A of this embodiment is similar to the light source apparatus 100 of FIG. 2 and FIG. 3, and a main difference between the two light source apparatuses lies in that, in this embodiment, the light source apparatus 100A further includes a light combining device 170, and the first light source 110 and the second light source 120 are disposed separately. In this embodiment, the light combining device 170 is located between the first light source 110 and the second light source 120, and the first light source 110 and the second light source 120 are located respectively at two opposite surfaces of the light combining device 170, for example. Nevertheless, the disclosure is not limited thereto. In this embodiment, the optical axis of the first light beam L1 provided by the first light source 110 is, for example, perpendicular to the optical axis of the second light beam L2 provided by the second light source 120. Nevertheless, the disclosure is not limited thereto. In other embodiments, the optical axis of the first light beam L1 may be neither parallel nor perpendicular to the optical axis of the second light beam L2. That is, the angle between the optical axis of the first light beam L1 and the optical axis of the second light beam L2 may be an arbitrary angle. In short, in this embodiment, an angle is formed between the optical axis of the first light beam L1 and the optical axis of the second light beam L2, and the angle ranges between 0° and 180°.

In order to simplify the descriptions of the first light beam L1, the second light beam L2, and the third light beam L3, FIG. 2, FIG. 3, FIG. 5, and FIG. 6 only illustrate a few main light beams. In other words, FIG. 2, FIG. 3, FIG. 5, and FIG. 6 do not illustrate the complete light path, and the illustrated first light beam L1, second light beam L2, and third light beam L3 are only part of the light beams.

Figure 7:
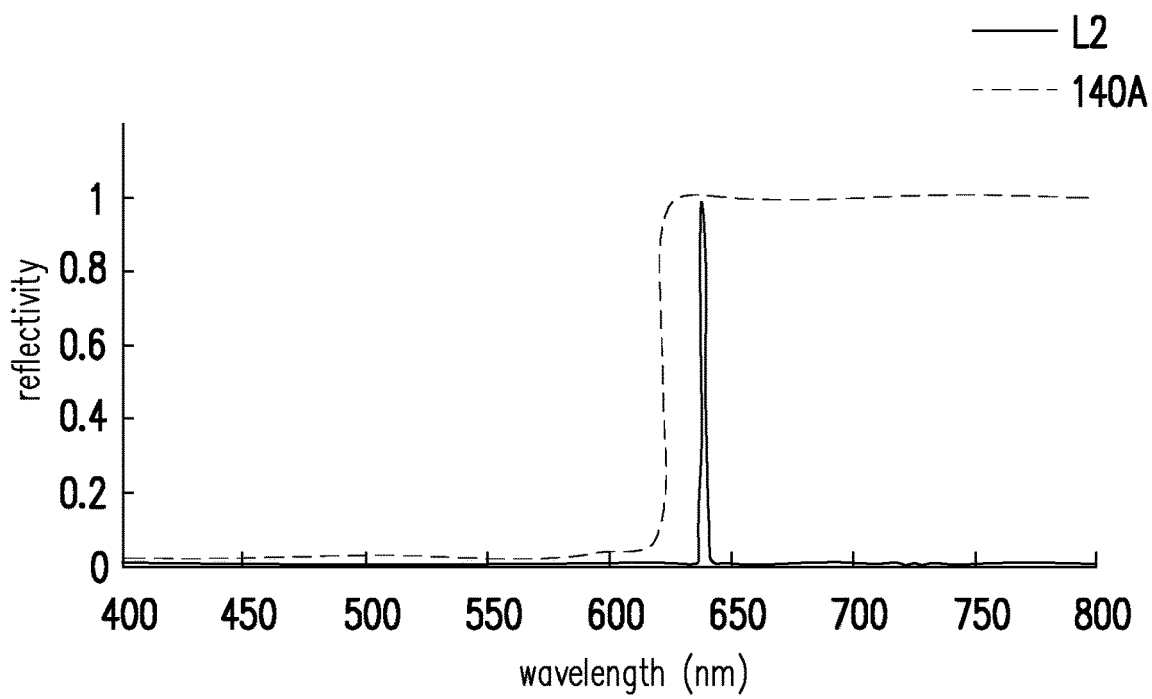
FIG. 7 to FIG. 11 are schematic diagrams of optical characteristics of the second light beam and the filter device according to five embodiments of the disclosure.

FIG. 7 is a schematic diagram of optical characteristics of the second light beam and the filter device according to an embodiment of the disclosure. A filter device 140A of FIG. 7 is at least applicable to the light source apparatus of FIG. 2, FIG. 3, FIG. 5, and/or FIG. 6. In this embodiment, the second light beam L2 is a light beam having a wavelength of 630 nm to 650 nm (red light beam), and the filter device 140A is optionally a filter device that is capable of reflecting a light beam in a wave band of 625 nm or above, e.g., a highpass filter that selectively allows a high-frequency light beam to pass through.

Figure 8:
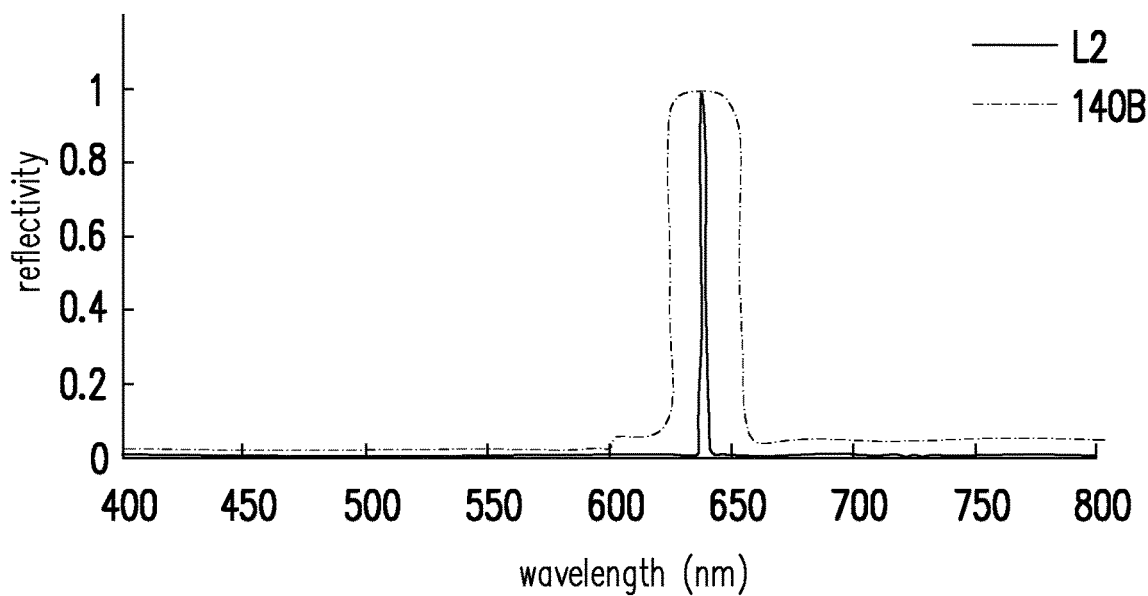

FIG. 8 is a schematic diagram of optical characteristics of the second light beam and the filter device according to another embodiment of the disclosure. A filter device 140B of FIG. 8 is at least applicable to the light source apparatus of FIG. 2, FIG. 3, FIG. 5, and/or FIG. 6. In this embodiment, the second light beam L2 is, for example, a light beam having a wavelength of 630 nm to 650 nm (red light beam), and the filter device 140B is optionally a filter device that is capable of reflecting a light beam in a wave band of 625 nm to 655 nm, e.g., a bandpass filter. In this embodiment, the filter device 140B is capable of reflecting the second light beam L2 while most of the conversion light beam L3 may still be transmitted/pass through the filter device 140B to return to the system, which improves the utilization efficiency of the second light beam L2 and the conversion light beam L3.

Figure 9:
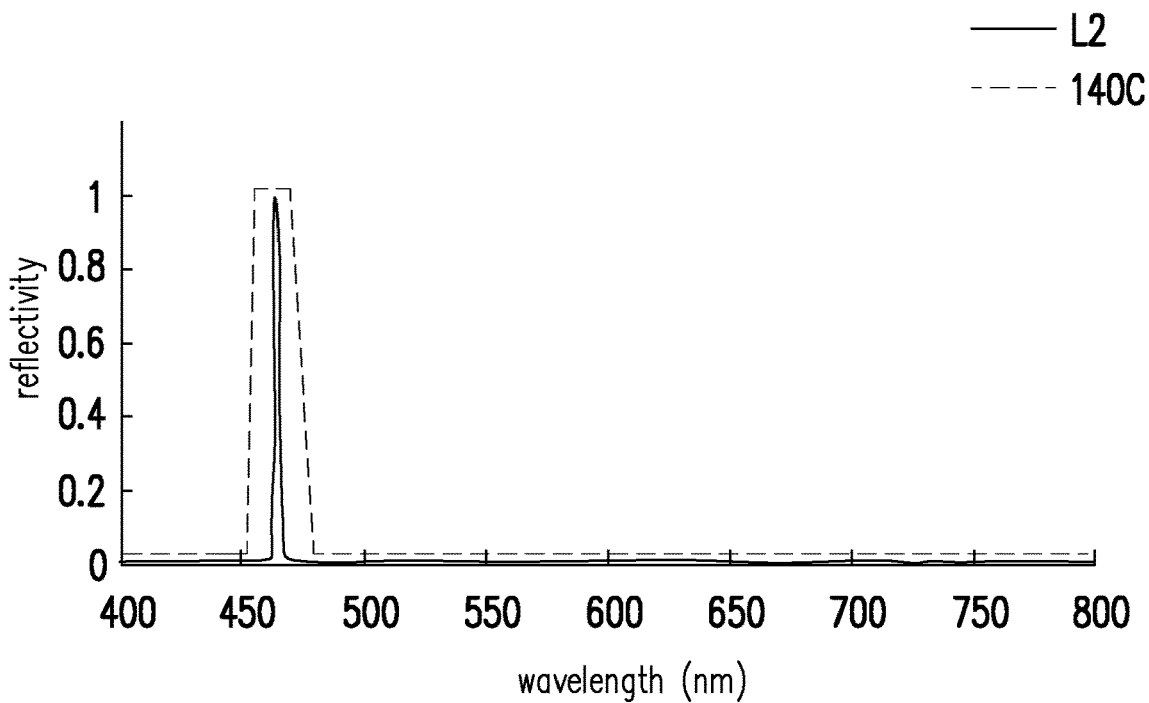
Figure 10:
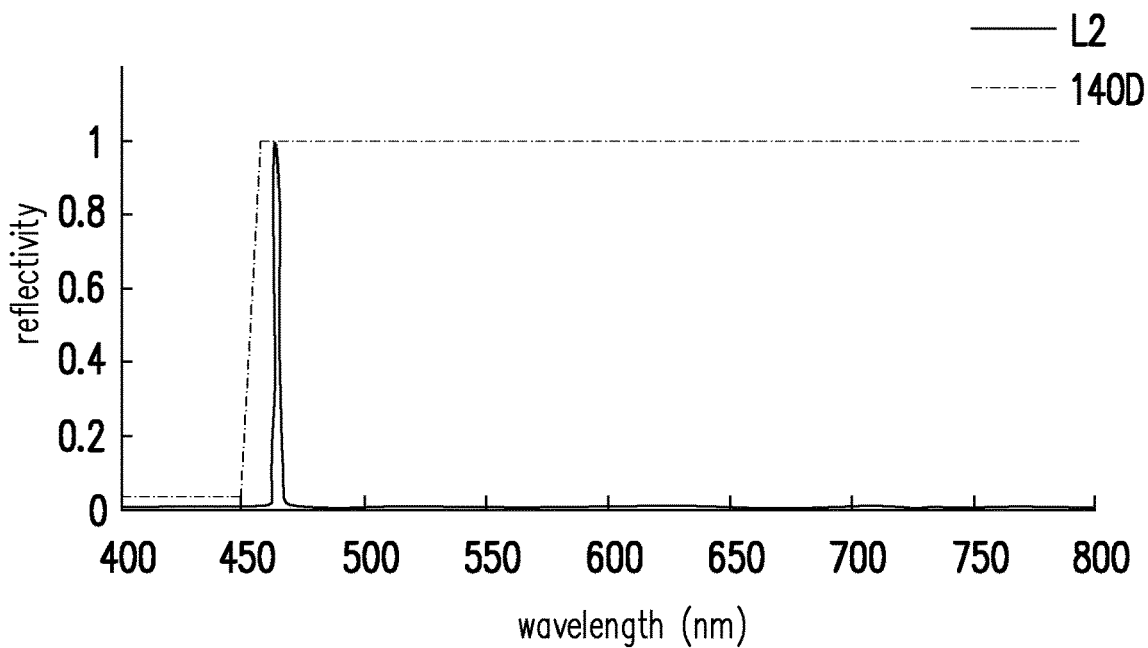
Figure 11:
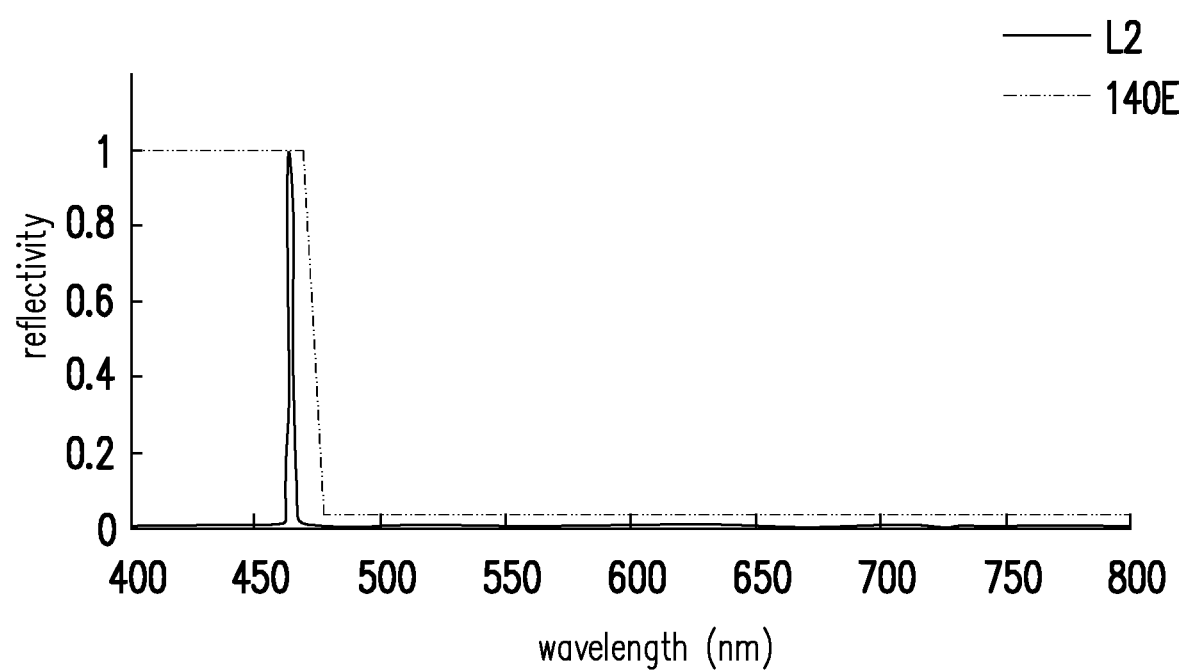

FIG. 9 to FIG. 11 are schematic diagrams of optical characteristics of the second light beam and the filter device according to the other three embodiments of the disclosure. The filter devices 140C, 140D, and 140E of FIG. 9 to FIG. 11 are at least applicable to the light source apparatus of FIG. 2, FIG. 3, FIG. 5, and/or FIG. 6. In this embodiment, the second light beam L2 is, for example, a light beam having a wavelength of 460 nm (blue light beam). In the embodiment of FIG. 9, the filter device 140C is a bandpass filter, for example. In the embodiment of FIG. 10, the filter device 140D is a highpass filter, for example. In the embodiment of FIG. 11, the filter device 140E is a low-pass filter, for example. It is known from the above that various types of filter devices are suitable for the projection apparatus. Therefore, the filter device of the embodiments of the disclosure not only improves the light utilization efficiency but also has versatility.

To sum up, the embodiments of the disclosure achieve at least one of the followings. According to the exemplary embodiments of the disclosure, the wavelength conversion device in the light source apparatus may be provided with a filter device thereon, such that the first light beam transmitted/passing through the filter device may be transmitted to the wavelength conversion device to be converted into the conversion light beam, and that the second light beam may be reflected back to the optical system. Therefore, the utilization efficiency of the second light beam and the conversion light beam is improved, so that the projection apparatus and the light source apparatus have favorable light source utilization efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising a light source apparatus, a light valve, and a projection lens,
   wherein the light source apparatus is configured to provide an illumination light beam and comprises at least one first light source, at least one second light source, a wavelength conversion device, a filter device, and a dichroic device, wherein the at least one first light source is configured to provide a first light beam;

the at least one second light source is configured to provide a second light beam, wherein a wavelength of the first light beam is different from a wavelength of the second light beam;

the wavelength conversion device is disposed on a transmission path of the first light beam from the at least one first light source and configured to convert the first light beam into a conversion light beam;

the filter device corresponds to the wavelength conversion device and is disposed between the at least one first light source and the wavelength conversion device and disposed between the at least one second light source and the wavelength conversion device, and is configured to allow the first light beam and the conversion light beam to pass through and reflect the second light beam, wherein the wavelength conversion device having a first surface, the filter device is located near or on the first surface, and the illumination light beam comprises the conversion light beam reflected from the wavelength conversion device and the second light beam reflected from the filter device;

the dichroic device is configured to allow the first light beam from the at least one first light source and the second light beam from the at least one second light source to pass through a front surface of the dichroic device, wherein a back surface of the dichroic device faces the filter device, so that the second light beam passes through the front surface of the dichroic device but is reflected when incident on the back surface of the dichroic device;

the light valve is disposed on a transmission path of the illumination light beam and configured to convert the illumination light beam into an image light beam; and the projection lens is disposed on a transmission path of the image light beam, wherein the image light beam becomes a projection light beam after passing through the projection lens.

2. The projection apparatus according to claim 1, wherein the wavelength conversion device comprises:

a wavelength conversion region configured to convert the first light beam from the filter device into the conversion light beam; and a non-wavelength conversion region configured to reflect the first light beam from the filter device to the filter device or configured to allow the first light beam from the filter device to pass through.

3. The projection apparatus according to claim 1, wherein an angle is formed between an optical axis of the first light beam and an optical axis of the second light beam, and the angle ranges between 0° and 180°.

4. The projection apparatus according to claim 1, wherein the wavelength conversion device comprises at least one wavelength conversion material, and the filter device corresponds to all or a part of the at least one wavelength conversion material.

5. The projection apparatus according to claim 1, wherein the filter device is a light filter.

6. The projection apparatus according to claim 1, wherein the filter device is a coating on the first surface of the wavelength conversion device.

7. The projection apparatus according to claim 1, wherein a wavelength difference between the first light beam from the at least one first light source and the second light beam from the at least one second light source is at least 5 mn or more.

8. A light source apparatus, comprising:

at least one first light source configured to provide a first light beam;

at least one second light source configured to provide a second light beam, wherein a wavelength of the first light beam is different from a wavelength of the second light beam;

a wavelength conversion device disposed on a transmission path of the first light beam from the at least one first light source and configured to convert the first light beam into a conversion light beam;

a filter device corresponding to the wavelength conversion device and disposed between the at least one first light source and the wavelength conversion device and disposed between the at least one second light source and the wavelength conversion device, and configured to allow the first light beam and the conversion light beam to pass through and reflect the second light beam, wherein the wavelength conversion device having a first surface, and the filter device is located near or on the first surface; and a dichroic device configured to allow the first light beam from the at least one first light source and the second light beam from the at least one second light source to pass through a front surface of the dichroic device, wherein a back surface of the dichroic device faces the filter device, so that the second light beam passes through the front surface of the dichroic device but is reflected when incident on the back surface of the dichroic device.

9. The light source apparatus according to claim 8, wherein the wavelength conversion device comprises:

a wavelength conversion region configured to convert the first light beam from the filter device into the conversion light beam; and a non-wavelength conversion region configured to reflect the first light beam from the filter device to the filter device or configured to allow the first light beam from the filter device to pass through.

10. The light source apparatus according to claim 8, wherein an angle is formed between an optical axis of the first light beam and an optical axis of the second light beam, and the angle ranges between 0° and 180°.

11. The light source apparatus according to claim 8, wherein the wavelength conversion device comprises at least one wavelength conversion material, and the filter device corresponds to all or a part of the at least one wavelength conversion material.

12. The light source apparatus according to claim 8, wherein the filter device is a light filter.

13. The light source apparatus according to claim 8, wherein the filter device is a coating on the first surface of the wavelength conversion device.

14. The light source apparatus according to claim 8, wherein a wavelength difference between the first light beam from the at least one first light source and the second light beam from the at least one second light source is at least 5 nm or more.

* * * * *